(12) United States Patent
Ketchum et al.

(10) Patent No.: US 7,551,698 B2
(45) Date of Patent: *Jun. 23, 2009

(54) DERIVATION OF EIGENVECTORS FOR SPATIAL PROCESSING IN MIMO COMMUNICATION SYSTEMS

(75) Inventors: John W. Ketchum, Harvard, MA (US); Mark S. Wallace, Bedford, MA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/849,976

(22) Filed: Sep. 4, 2007

(65) Prior Publication Data

US 2007/0297526 A1 Dec. 27, 2007

Related U.S. Application Data

(63) Continuation of application No. 10/729,070, filed on Dec. 4, 2003, now Pat. No. 7,280,625.

(60) Provisional application No. 60/432,760, filed on Dec. 11, 2002.

(51) Int. Cl.
*H03D 1/00* (2006.01)
(52) U.S. Cl. ...................................... 375/343; 375/349
(58) Field of Classification Search ................. 375/260, 375/299, 347, 349, 343, 350, 148, 144
See application file for complete search history.

(56) References Cited

U.S. PATENT DOCUMENTS 7,039,001 B2 * 5/2006 Krishnan et al. ............ 370/203

2006/0023666 A1 * 2/2006 Jalali et al. .................. 370/334

FOREIGN PATENT DOCUMENTS

| DE | 10162548 | 7/2003 |
|---|---|---|
| EP | 0905920 | 3/1999 |

OTHER PUBLICATIONS

International Search Report, PCT/US03/039392—International Search Authority—European Patent Office—May 19, 2004.
Marzetta. T L, "Blast Training: Estimating Channel Characteristics for High-Capacity Space-Time Wireless", Proceedings 37th Annual Allerton Conference on Communication, Control, and Computing, Sep. 22, 1999-Sep. 24, 1999, pp. 958-966.
Zhuralev, "Poisk I Sinkhronizatsia V Vhirokopolosnykh Sistemakh (Search and Synchronization in Wideband Systems)", Moscow, 1986, pp. 120-125, figs. 4.7-4.10.
European Search Report-EP08006516; Search Authority-Munich Patent Office- May 21, 2008.

* cited by examiner

*Primary Examiner*—Emmanuel Bayard
(74) *Attorney, Agent, or Firm*—Ross L. Franks

(57) ABSTRACT

Techniques for deriving eigenvectors based on steered reference and used for spatial processing. A steered reference is a pilot transmission on one eigenmode of a MIMO channel per symbol period using a steering vector for that eigenmode. The steered reference is used to estimate both a matrix $\Sigma$ of singular values and a matrix U of left eigenvectors of a channel response matrix H. A matrix $\tilde{U}$ with orthogonalized columns may be derived based on the estimates of $\Sigma$ and U, e.g., using QR factorization, minimum square error computation, or polar decomposition. The estimates of $\Sigma$ and U (or the estimate of $\Sigma$ and the matrix $\tilde{U}$) may be used for matched filtering of data transmission received via a first link. The estimate of U or the matrix $\tilde{U}$ may also be used for spatial processing of data transmission on a second link (for reciprocal first and second links).

38 Claims, 6 Drawing Sheets

DERIVATION OF EIGENVECTORS FOR SPATIAL PROCESSING IN MIMO COMMUNICATION SYSTEMS

CLAIM OF PRIORITY

This application for Patent is a continuation of, and claims the benefit of priority from, U.S. patent application Ser. No. 10/729,070, filed on Dec. 4, 2003 and entitled "Derivation of Eigenvectors for Spatial Processing in MIMO Communication Systems", which claims the benefit of priority from U.S. Provisional Patent Application No. 60/432,760, filed Dec. 11, 2002 and entitled "Derivation of Eigenvectors for Spatial Processing in MIMO Communication Systems", both of which are assigned to the assignee hereof and are fully incorporated herein by reference for all purposes.

BACKGROUND

1. Field

The present invention relates generally to data communication, and more specifically to techniques for deriving eigenvectors based on steered reference and used for spatial processing in multiple-input multiple-output (MIMO) communication systems.

2. Background

A MIMO system employs multiple (NT) transmit antennas and multiple (NR) receive antennas for data transmission. A MIMO channel formed by the NT transmit and NR receive antennas may be decomposed into NS independent or spatial channels, where $N_S \leq \min\{N_T, N_R\}$. Each of the NS independent channels corresponds to a dimension. The MIMO system can provide improved performance (e.g., increased transmission capacity and/or greater reliability) if the additional dimensionalities created by the multiple transmit and receive antennas are effectively utilized.

In a wireless communication system, data to be transmitted is typically processed (e.g., coded and modulated) and then upconverted onto a radio frequency (RF) carrier signal to generate an RF modulated signal that is more suitable for transmission over a wireless channel. For a wireless MIMO system, up to NT RF modulated signals may be generated and transmitted simultaneously from the NT transmit antennas. The transmitted RF modulated signals may reach the NR receive antennas via a number of propagation paths in the wireless channel. The characteristics of the propagation paths typically vary over time due to various factors such as, for example, fading, multipath, and external interference. Consequently, the RF modulated signals may experience different channel conditions (e.g., different fading and multipath effects) and may be associated with different complex gains and signal-to-noise ratios (SNRs).

To achieve high performance, it is often necessary to estimate the response of the wireless channel between the transmitter and the receiver. For a MIMO system, the channel response may be characterized by a channel response matrix H, which includes $N_T N_R$ complex gain values for $N_T N_R$ different transmit/receive antenna pairs (i.e., one complex gain for each of the NT transmit antennas and each of the NR receive antennas). Channel estimation is normally performed by transmitting a pilot (i.e., a reference signal) from the transmitter to the receiver. The pilot is typically generated based on known pilot symbols and processed in a known manner (i.e., known a priori by the receiver). The receiver can then estimate the channel gains as the ratio of the received pilot symbols over the known pilot symbols.

The channel response estimate may be needed by the transmitter to perform spatial processing for data transmission. The channel response estimate may also be needed by the receiver to perform spatial processing (or matched filtering) on the received signals to recover the transmitted data. Spatial processing needs to be performed by the receiver and is typically also performed by the transmitter to utilize the NS independent channels of the MIMO channel.

For a MIMO system, a relatively large amount of system resources may be needed to transmit the pilot from the NT transmit antennas such that a sufficiently accurate estimate of the channel response can be obtained by the receiver in the presence of noise and interference. Moreover, extensive computation is normally needed to process the channel gains to obtain eigenvectors needed for spatial processing. In particular, the receiver is typically required to process the channel gains to derive a first set of eigenvectors used for spatial processing for data reception on one link and may further be required to derive a second set of eigenvectors used for spatial processing for data transmission on the other link. The derivation of the eigenvectors and the spatial processing for data transmission and reception are described below. The second set of eigenvectors typically needs to be sent back to the transmitter for its use. As can be seen, a large amount of resources may be needed to support spatial processing at the transmitter and receiver.

There is therefore a need in the art for techniques to more efficiently derive eigenvectors used for spatial processing in MIMO systems.

SUMMARY

Techniques are provided herein for deriving eigenvectors based on steered reference and used for spatial processing for data reception and transmission. A steered reference is a pilot transmission on only one spatial channel or eigenmode of a MIMO channel for a given symbol period, which is achieved by performing spatial processing with a steering vector for that eigenmode, as described below. The steered reference is used by a receiver to derive estimates of both a diagonal matrix $\Sigma$ of singular values and a unitary matrix U of left eigenvectors of the channel response matrix H, without having to estimate the MIMO channel response or perform singular value decomposition of H.

The estimates of $\Sigma$ and U may be used for matched filtering of data transmission received via a first link (e.g., the uplink). For a time division duplex (TDD) system, which is characterized by downlink and uplink channel responses that are reciprocal of one another, the estimate of U may also be used for spatial processing of data transmission on a second link (e.g., the downlink).

In another aspect, a matrix $\tilde{U}$ with orthogonal columns is derived based on the estimates of $\Sigma$ and U. The orthogonalization of the columns of $\tilde{U}$ may be achieved by various techniques such as QR factorization, minimum square error computation, and polar decomposition, all of which are described below. An orthogonal matched filter matrix $\hat{M}$ may then be derived based on the matrix $\tilde{U}$ and the estimate of $\Sigma$. The matrix $\hat{M}$ may be used for matched filtering for the first link, and the matrix $\tilde{U}$ may be used for spatial processing for the second link.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
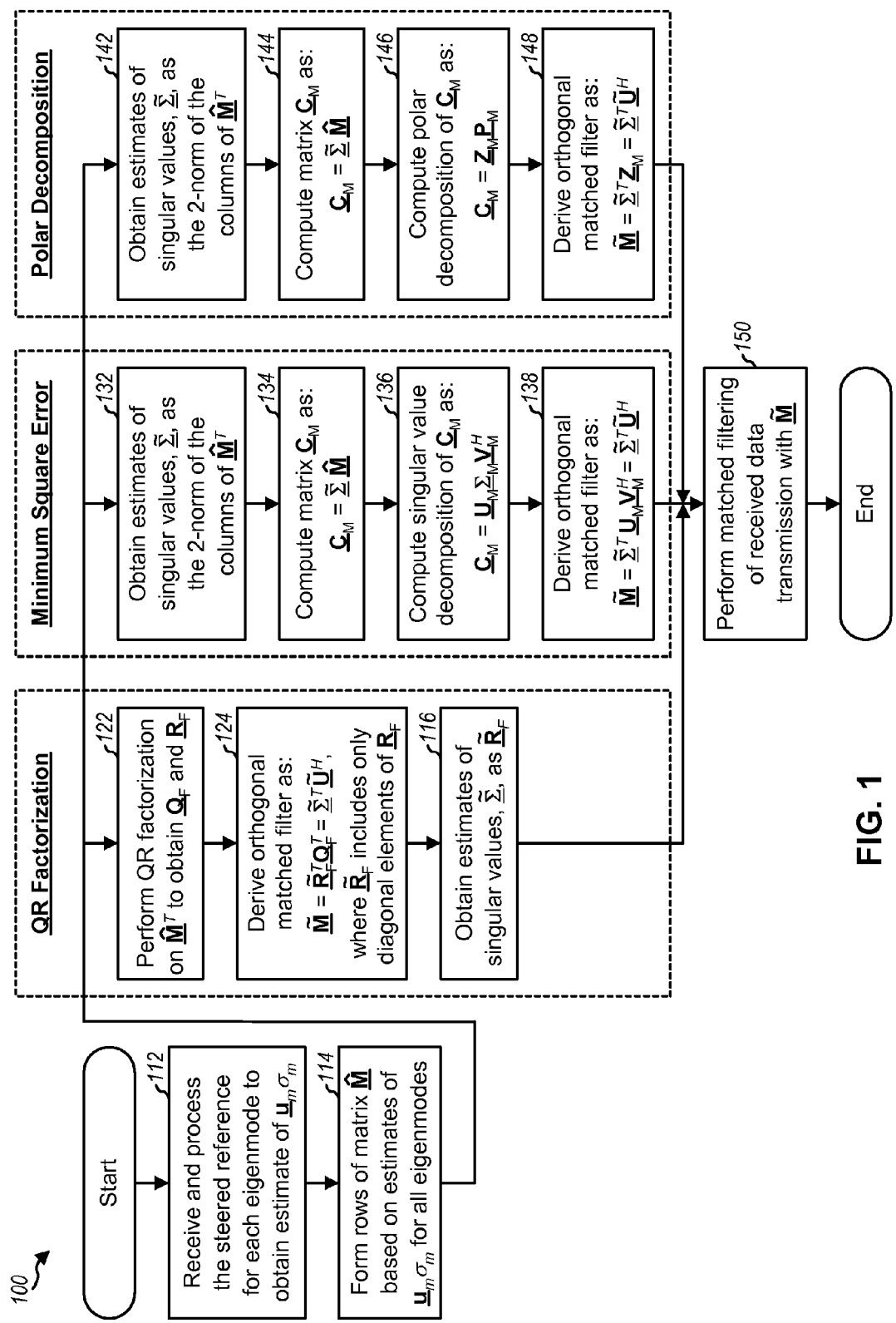
FIG. 1 shows a flow diagram of a process for deriving an orthogonal matched filter matrix M based on a steered reference.

The word "exemplary" is used herein to mean "serving as an example, instance, or illustration." Any embodiment or design described herein as "exemplary" is not necessarily to be construed as preferred or advantageous over other embodiments or designs.

The techniques described herein for deriving eigenvectors may be used for various MIMO communication systems. For example, these techniques may be used for single-carrier MIMO systems as well as multi-carrier MIMO systems. For clarity, these techniques are described below for a single-carrier MIMO system.

The model for a single-carrier MIMO system may be expressed as:

$$r = Hx + n, \text{ where} \qquad \text{Eq (1)}$$

x is a "transmit" vector with $N_T$ entries for the symbols sent from the $N_T$ transmit antennas (i.e., $x = [x_1 \; x_2 \; \ldots \; x_{N_T}]^T$);

r is a "receive" vector with $N_R$ entries for the symbols received via the $N_R$ receive antennas (i.e., $r = [r_1 \; r_2 \; \ldots \; r_{N_R}]^T$);

H is an ($N_R \times N_T$) channel response matrix;

n is a vector of additive white Gaussian noise (AWGN); and

"$T$" denotes the transpose.

The noise vector n is assumed to have components with zero mean and a covariance matrix of $\Lambda_n = \sigma^2 I$, where I is the identity matrix and $\sigma^2$ is the noise variance.

The channel response matrix H may be expressed as:

$$H = \begin{bmatrix} h_{1,1} & h_{1,2} & \ldots & h_{1,N_T} \\ h_{2,1} & h_{2,2} & \ldots & h_{2,N_T} \\ \vdots & \vdots & \ddots & \vdots \\ h_{N_R,1} & h_{N_R,2} & \ldots & h_{N_R,N_T} \end{bmatrix}, \qquad \text{Eq (2)}$$

where entry $h_{i,j}$, for $i \in \{1 \ldots N_R\}$ and $j \in \{1 \ldots N_T\}$, is the coupling (i.e., complex gain) between the j-th transmit antenna and the i-th receive antenna. For simplicity, the channel response is assumed to be flat across the entire system bandwidth, and the channel response for each transmit/receive antenna pair can be represented by a single complex value $h_{i,j}$. Also for simplicity, the following description assumes that $N_R \geq N_T$, the channel response matrix H has full rank, and $N_S = N_T \leq N_R$.

The channel response matrix H may be "diagonalized" to obtain the NT independent channels, which are also referred to as spatial channels or eigenmodes. This diagonalization may be achieved by performing either singular value decomposition of the channel response matrix H or eigenvalue decomposition of the correlation matrix of H, which is $H^H H$, where "H" denotes the conjugate transpose. For clarity, singular value decomposition is used for the following description.

The singular value decomposition of the channel response matrix H may be expressed as:

$$H = U \Sigma V^H, \text{ where} \qquad \text{Eq (3)}$$

U is an ($N_R \times N_R$) unitary matrix whose columns are left eigenvectors of H;

$\Sigma$ is an ($N_R \times N_T$) diagonal matrix of singular values of H, which is $\Sigma = \text{diag}(\sigma_{1,1} \; \sigma_{2,2} \ldots \sigma_{N_T, N_T})$; and V is an ($N_T \times N_T$) unitary matrix whose columns are right eigenvectors of H.

A unitary matrix M is characterized by the property $M^H M = I$, which means that the columns of the unitary matrix are orthogonal to one another and the rows of the matrix are also orthogonal to one another. The columns of the matrix V are also referred to as steering vectors. Singular value decomposition is described in further detail by Gilbert Strang in a book entitled "Linear Algebra and Its Applications," Second Edition, Academic Press, 1980.

Spatial processing may be performed by both the transmitter and the receiver to transmit data on the NT spatial channels of the MIMO channel. The spatial processing at the transmitter may be expressed as:

$$x = Vs, \qquad \text{Eq (4)}$$

where s is a "data" vector with up to $N_T$ non-zero entries for data symbols to be transmitted on the $N_T$ spatial channels. The transmit vector x is further processed and then transmitted over the MIMO channel to the receiver.

The received transmission at the receiver may be expressed as:

$$r = Hx + n = HVs + n = U \Sigma V^H V s + n = U \Sigma s + n, \qquad \text{Eq (5)}$$

where all the terms are defined above.

The spatial processing at the receiver to recover the data vector s may be expressed as:

$$\hat{s} = GMr = G\Sigma^T U^H r = G\Sigma^T U^H (U \Sigma s + n) = s + \tilde{n}, \qquad \text{Eq (6)}$$

where s is the data vector;

$\hat{s}$ is an estimate of the data vector s;

M is an ($N_T \times N_R$) matched filter matrix, which is $M = \Sigma^T U^H$;

G is an ($N_T \times N_T$) scaling matrix, which is $G = \text{diag}(1/\sigma_{1,1}^2 \; 1/\sigma_{2,2}^2 \ldots 1/\sigma_{N_T, N_T}^2)$; and $\tilde{n}$ is the post-processed noise, which is $\tilde{n} = G\Sigma^T U^H n$.

The spatial processing by the receiver is often referred to as matched filtering. Since $M = \Sigma^T U^H$ and since the columns of U are left eigenvectors of H, the columns of $M^T$ are conjugated left eigenvectors of H scaled by the singular values in $\Sigma$.

As shown in equation (6), the receiver needs good estimates of the matrices $\Sigma$ and U in order to perform the matched filtering to recover the data vector s. The matrices $\Sigma$ and U may be obtained by transmitting a pilot from the transmitter to the receiver. The receiver can then estimate the channel response matrix H based on the received pilot and perform the singular value decomposition of this estimate, as shown in equation (3), to obtain the matrices Σ and U. However, as noted above, a large amount of resources may be needed to transmit this pilot and to perform the singular value decomposition.

Steered Reference

In an aspect, a steered reference is transmitted by the transmitter and used by the receiver to derive estimates of the matrices Σ and U, which are needed for matched filtering. The steered reference is a pilot transmission on only one spatial channel or eigenmode for a given symbol period, which is achieved by performing spatial processing with a steering vector for that eigenmode. The receiver can then estimate the matrices Σ and U based on the steered reference, without having to estimate the MIMO channel response or perform the singular value decomposition.

A steered reference sent by the transmitter may be expressed as:

$$x_{sr,m} = v_m \cdot p, \text{ for } m \in \{1 \ldots N_T\}, \quad \text{Eq (7)}$$

where $x_{sr,m}$ is the transmit vector for the steered reference for the m-th eigenmode;
$v_m$ is the right eigenvector of H for the m-th eigenmode; and
p is a pilot symbol transmitted for the steered reference.

The eigenvector $v_m$ is the m-th column of the matrix V, where $V = [v_1 \; v_2 \ldots v_{N_T}]$.

The received steered reference at the receiver may be expressed as:

$$r_{sr,m} = Hx_{sr,m} + n = Hv_m p + n = U\Sigma V^H v_m p + n = u_m \sigma_m p + n, \quad \text{Eq (8)}$$

where $r_{sr,m}$ is the receive vector for the steered reference for the m-th eigenmode; and
$\sigma_m$ is the singular value for the m-th eigenmode.

As shown in equation (8), at the receiver, the received steered reference in the absence of noise is equal to $u_m \sigma_m p$, which is the known pilot symbol p transformed by $u_m \sigma_m$. The eigenvector $u_m$ is the m-th column of the matrix U, and the singular value $\sigma_m$ is the m-th diagonal element of the matrix Σ. The receiver can thus obtain an estimate of $u_m \sigma_m$ based on the steered reference sent by the transmitter.

Various techniques may be used to process the received steered reference to obtain estimates of $u_m$ and $\sigma_m$. In one embodiment, to obtain an estimate of $u_m \sigma_m$, the receive vector $r_{sr,m}$ for the steered reference sent on the m-th eigenmode is first multiplied with the complex conjugate of the pilot symbol, p*. The result may then be integrated over multiple steered reference symbols received for each eigenmode m to obtain the estimate of $u_m \sigma_m$. A row vector $\hat{m}_m$ may be defined to be equal to the conjugate transpose of the estimate of $u_m \sigma_m$ (i.e., $\hat{m}_m = \hat{\sigma}_m \hat{u}_m^H$). Each of the NR entries of the vector $\hat{m}_m$ is obtained based on a corresponding one of the NR entries of the vector $r_{sr,m}$.

The row vector $\hat{m}_m$ for the m-th eigenmode includes estimates of both $u_m$ and $\sigma_m$, and may thus be referred to as a scaled vector. Since eigenvectors have unit power, the singular value $\sigma_m$ may be estimated based on the received power of the steered reference, which can be measured for each eigenmode. In particular, the singular value estimate $\hat{\sigma}_m$ may be set equal to the square root of the power for the vector $r_{sr,m}$, divided by the magnitude of the pilot symbol p. The vector $\hat{m}_m$ may be scaled by $1/\hat{\sigma}_m$ to obtain the eigenvector $\hat{u}_m$.

In another embodiment, a minimum mean square error (MMSE) technique is used to obtain an estimate of $u_m$ based on the receive vector $r_{sr,m}$ for the steered reference. Since the pilot symbol p is known, the receiver can derive an estimate of $u_m$ such that the mean square error between the recovered pilot symbol $\hat{p}$ (which is obtained after performing matched filtering on the receive vector $r_{sr,m}$) and the transmitted pilot symbol p is minimized.

The steered reference is transmitted for one eigenmode at a time (i.e., one eigenmode for each symbol period of steered reference transmission). The steered reference for all NT eigenmodes may be transmitted in various manners. In one embodiment, the steered reference is transmitted for one eigenmode for each frame, where a frame is an interval of data transmission for the system and is defined to be of a particular time duration (e.g., 2 msec). For this embodiment, the steered reference for multiple eigenmodes may be transmitted in multiple frames. In another embodiment, the steered reference is transmitted for multiple eigenmodes within one frame. This may be achieved by cycling through the NT eigenmodes in NT symbol periods. For both embodiments, the n-th steered reference symbol may be expressed as:

$$x_{sr,m}(n) = v_{[n \bmod N_T]+1} \cdot p, \text{ for } n \in \{1 \ldots L\}, \quad \text{Eq (9)}$$

where n is an index for either symbol period or frame number and L is the number of steered reference symbols to be transmitted. Multiple steered reference symbols may be transmitted for each eigenmode m to allow the receiver to obtain more accurate estimate of $u_m \sigma_m$.

The receiver is able to obtain the row vector $\hat{m}_m$ for each of the NT eigenmodes based on the received steered reference for that eigenmode. The row vectors $\hat{m}_m$ for all NT eigenmodes may be used to form an initial matched filter matrix $\hat{M}$, where $\hat{M} = [\hat{m}_1 \; \hat{m}_2 \ldots \hat{m}_{N_T}]^T$ and $\hat{M} = \hat{\Sigma}^T \hat{U}^H$. The matrix $\hat{M}$ may be used for matched filtering by the receiver, as shown in equation (6), to recover the transmitted data vector s.

The steered reference is sent for one eigenmode at a time and may be used by the receiver to obtain the matched filter vector $\hat{m}_m$ for that eigenmode. Since the NT matched filter vectors $\hat{m}_m$ of the matrix $\hat{M}$ are obtained individually and over different symbol periods, and due to noise and other sources of degradation in the wireless channel, the NT vectors $\hat{m}_m$ of the matrix $\hat{M}$ are not likely to be orthogonal to one another. If the NT vectors $\hat{m}_m$ are thereafter used for matched filtering of a received data transmission, then any errors in orthogonality among these vectors would result in cross-talk between the individual symbol streams sent on the NT eigenmodes. The cross-talk may degrade performance.

Eigenvector Orthogonalization

In another aspect, to improve performance, an enhanced matched filter matrix M is derived based on the steered reference and has row vectors that are forced to be orthogonal to one other. The orthogonalization of the row vectors of M may be achieved by various techniques such as QR factorization, minimum square error computation, and polar decomposition. All of these orthogonalization techniques are described in detail below. Other orthogonalization techniques may also be used and are within the scope of the invention.

1. QR Factorization

QR factorization decomposes the transposed initial matched filter matrix, $\hat{M}^T$, into an orthogonal matrix $Q_F$ and an upper triangle matrix $R_F$. The matrix $Q_F$ forms an orthogonal basis for the columns of the matrix $\hat{M}^T$ (i.e., the rows of $\hat{M}$), and the diagonal elements of the matrix $R_F$ give the length of the components of the columns of $\hat{M}^T$ in the directions of the respective columns of $Q_F$. The matrices $Q_F$ and $R_F$ may be used to derive an enhanced matched filter matrix $M_F$.

The QR factorization may be performed by various methods, including a Gram-Schmidt procedure, a householder transformation, and so on. The Gram-Schmidt procedure is recursive and may be numerically unstable. Various variants of the Gram-Schmidt procedure have been devised and are known in the art. The "classical" Gram-Schmidt procedure for orthogonalizing the matrix $\hat{M}^T$ is described below.

For QR factorization, the matrix $\hat{M}^T$ may be expressed as:

$$\hat{M}^T = Q_F R_F, \qquad \text{Eq (10)}$$

where $Q_F$ is an $(N_R \times N_R)$ orthogonal matrix; and $R_F$ is an $(N_R \times N_T)$ upper triangle matrix with zeros below the diagonal and possible non-zero values along and above the diagonal.

The Gram-Schmidt procedure generates the matrices $Q_F$ and $R_F$ column-by-column. The following notations are used for the description below:

$Q_F = [q_1 \ q_2 \ \ldots \ q_{N_R}]$, where $q_j$ is the j-th column of $Q_F$;

$q_{i,j}$ is the entry in the i-th row and j-th column of $Q_F$;

$\tilde{Q}_F = [\tilde{q}_1 \ \tilde{q}_2 \ \ldots \ \tilde{q}_{N_R}]$, where $\tilde{q}_j$ is the j-th column of $\tilde{Q}_F$;

$r_{i,j}$ is the entry in the i-th row and j-th column of $R_F$;

$\hat{M}^T = [\hat{m}_1 \ \hat{m}_2 \ \ldots \ \hat{m}_{N_T}]$, where $\hat{m}_j$ is the j-th column of $\hat{M}^T$; and $\hat{m}_{i,j}$ is the entry in the i-th row and j-th column of $\hat{M}^T$.

The first column of $Q_F$ and $R_F$ may be obtained as:

$$r_{1,1} = \|\hat{m}_1\| = \left[\sum_{i=1}^{N_R} |\hat{m}_{i,1}|^2\right]^{1/2}, \text{ and} \qquad \text{Eq (11)}$$

$$q_1 = \frac{1}{r_{1,1}} \hat{m}_1. \qquad \text{Eq (12)}$$

The first column of $R_F$ includes one non-zero value $r_{1,1}$ for the first row and zeros elsewhere, where $r_{1,1}$ is the 2-norm of $\hat{m}_1$. The first column of $Q_F$ is a normalized version of the first column of $\hat{M}^T$, where the normalization is achieved by scaling each entry of $\hat{m}_1$ with the inverse of $r_{1,1}$.

Each of the remaining columns of $Q_F$ and $R_F$ may be obtained as follows:

FOR $j = 2, 3 \ldots N_T$

FOR $i = 1, 2 \ldots j-1$ $$r_{i,j} = q_i^H \hat{m}_j \qquad \text{Eq (13)}$$

$$\tilde{q}_j = \hat{m}_j - \sum_{i=1}^{j-1} r_{i,j} \cdot q_i \qquad \text{Eq (14)}$$

$$r_{j,j} = \|\tilde{q}_j\| \qquad \text{Eq (15)}$$

$$q_j = \frac{1}{r_{j,j}} \tilde{q}_j. \qquad \text{Eq (16)}$$

The Gram-Schmidt procedure generates one column at a time for the matrix $Q_F$. Each new column of $Q_F$ is forced to be orthogonal to all prior-generated columns to the left of the new column. This is achieved by equations (14) and (16), where the j-th column of $Q_F$ (or $q_j$) is generated based on $\tilde{q}_j$, which in turn is generated based on the j-th column of $\hat{M}^T$ (or $\hat{m}_j$) and subtracting out any components in $\hat{m}_j$ pointing in the direction of the other (j-1) columns to the left of $\hat{m}_j$. The diagonal elements of $R_F$ are computed as the 2-norm of the columns of $\tilde{Q}_F$ (where $\tilde{q}_1 = \hat{m}_1$), as shown in equation (15).

Improved performance may be attained by ordering the matrix $\hat{M}^T$ based on the singular value estimates before performing the QR factorization. The initial singular value estimates $\tilde{\sigma}_m$, for $m \in \{1 \ldots N_T\}$, for diagonal matrix $\Sigma$ may be computed as the 2-norm of the columns of $\hat{M}^T$, as described below. The initial singular value estimates may then be ordered such that $\{\tilde{\sigma}_1 \geq \tilde{\sigma}_2 \geq \ldots \geq \tilde{\sigma}_{N_T}\}$, where $\tilde{\sigma}_1$ is the largest singular value estimate and $\tilde{\sigma}_{N_T}$ is the smallest singular value estimate. When the initial singular value estimates for the diagonal matrix $\Sigma$ are ordered, the columns of the matrix $\hat{M}^T$ are also ordered correspondingly. The first or left-most column of $\hat{M}^T$ would then be associated with the largest singular value estimate and the highest received SNR, and the last or right-most column of $\hat{M}^T$ would be associated with the smallest singular value estimate and the lowest received SNR. For the QR factorization, the initial singular value estimates may be obtained as the 2-norm of the columns of $\hat{M}^T$ and used for ordering the columns of $\hat{M}^T$. The final singular value estimates are obtained as the 2-norm of the columns of $\tilde{Q}_F$, as described above. The steered reference may also be transmitted in order (e.g., from the largest eigenmode to the smallest eigenmode), so that the singular value estimates are effectively ordered by the transmitter.

If the columns of $\hat{M}^T$ are ordered based on decreasing values of their associated singular value estimates, then the columns/eigenvectors of $Q_F$ are forced to be orthogonal to the first column/eigenvector with the best received SNR. This ordering thus has the beneficial effect of rejecting certain noise components of each of the remaining eigenvectors of $Q_F$. In particular, the j-th column of $Q_F$ (or $q_j$) is generated based on the j-th column of $\hat{M}^T$ (or $\hat{m}_j$), and noise components in $\hat{m}_j$ that point in the direction of the j-1 eigenvectors to the left of $q_j$ (which are associated with higher received SNRs) are subtracted from $\hat{m}_j$ to obtain $q_j$. The ordering also has the beneficial effect of improving the estimates of eigenvectors associated with smaller singular values. The overall result is improved performance, especially if the orthogonalized eigenvectors of $Q_F$ are used for spatial processing for data transmission on the other link, as described below.

The enhanced orthogonal matched filter $\hat{M}_F$ obtained based on QR factorization may then be expressed as:

$$\hat{M}_F^T = Q_F \hat{R}_F, \qquad \text{Eq (17)}$$

where $\hat{R}_F$ includes only the diagonal elements of $R_F$ (i.e., the elements above the diagonal are set to zeros). The diagonal elements of $\hat{R}_F$ and $R_F$ are estimates of the singular values of $H$. Since $M = \Sigma^T U^H$ and $\hat{M}_F = \hat{R}_F^T Q_F^T$, the following substitutions may be made: $\hat{R}_F \approx \Sigma$ and $Q_F \approx U^*$, where "*" denotes the complex conjugate.

2. Mean Square Error Computation and Polar Decomposition

The initial matched filter matrix $\hat{M}$ may also be orthogonalized based on a particular optimality criterion. One possible criterion is to minimize a measure of the squared error between the matrix $\hat{M}$ and an "optimum" matched filter with the desired orthogonality properties. This may be expressed as:

$$\text{minimize} \|\hat{M} - \Sigma^T Q_P\|_F \text{ subject to } Q_P^H Q_P = I, \qquad \text{Eq (18)}$$

where $\|X\|_F$ is the Frobenius norm of X, and is given as:

$$\|X\|_F = \left[\sum_{i,j} |x_{ij}|^2\right]^{1/2}. \quad \text{Eq (19)}$$

The condition $Q_P^H Q_P = I$ ensures that $Q_P$ is a unitary matrix, which would mean that the columns of $Q_P$ are orthogonal to one another and the rows of $Q_P$ are also orthogonal to one another. Equation (18) results in an optimum matched filter $\Sigma^T Q_P$ that is the best fit to the measured data given by the matrix $\hat{M}$.

The solution to equation (18) can be obtained from the known solution to the orthogonal Procrustes problem. This problem asks the question—given two known matrices A and B, can a unitary matrix $Q_P$ be found that rotates B into A. The problem may be expressed as:

$$\text{minimize } \|A - BQ_P\|_F \text{ subject to } Q_P^H Q_P = I. \quad \text{Eq (20)}$$

The solution to the Procrustes problem can be obtained as follows. First, a matrix $C_P$ is defined as $C_P = B^H A$. The singular value decomposition of $C_P$ is then given as $C_P = U_P \Sigma_P V_P^H$ or $U_P^H C_P V_P = \Sigma_P$. The unitary matrix $Q_P$ that solves the minimization problem shown in equation (20) is then given as:

$$Q_P = U_P V_P^H. \quad \text{Eq (21)}$$

The derivation and proof for equation (21) is described by G. H. Golub and C. F. Van Loan in "Matrix Computation", Third Edition, Johns Hopkins University Press, 1996.

The solution for equation (20), which is shown in equation (21), is related to the polar decomposition of the matrix C. This polar decomposition is given as:

$$C_P = Z_P P_P, \quad \text{Eq (22)}$$

where $Z_P$ is a unitary matrix, which is given as $Z_P = \tilde{U}_P V_P^H$;

$\tilde{U}_P$ is a matrix of left eigenvectors of $C_P$ that spans the column space of $C_P$ (i.e., $\tilde{U}_P$ is equal to $U_P$ or a sub-matrix of $U_P$ depending on the dimension of $C_P$);

$P_P$ is a Hermitian symmetric positive semi-definite matrix, which is given as $P_P = V_P \Sigma_P V_P^H$; and $\Sigma_P$ is a square matrix of singular values of $C_P$ with dimension equal to the number of columns of $C_P$.

Polar decomposition can thus be performed on the matrix $C_P$ to obtain the unitary matrix $Z_P$, which may be equal to either $Q_P$ or a sub-matrix of $Q_P$ depending on the dimension of $C_P$. It can be shown that the matrix $Z_P$ is the optimal result to the minimization problem shown in equation (20).

Algorithms for direct computation of polar decomposition are described by P. Zielinski and K. Zietak in "The Polar Decomposition—Properties, Applications and Algorithms," Annals of the Polish Mathematical Society, 38 (1995), and by A. A. Dubrulle in "An Optimum Iteration for the Matrix Polar Decomposition," Electronic Transactions on Numerical Analysis, Vol. 8, 1999, pp. 21-25.

The solution for the optimum matched filter expressed in equation (18) may be obtained based on the solution to the orthogonal Procrustes problem described above. This may be achieved by equating $\hat{M}$ to A and $\Sigma^T$ to B. For the computation, an estimate of the singular values, $\tilde{\Sigma}$, may be obtained as the 2-norm of the columns of $\hat{M}^T$ and used in place of $\Sigma$. The diagonal elements of $\tilde{\Sigma}$ may be expressed as:

$$\tilde{\sigma}_{i,i} = \|\hat{m}_i\| = \left[\sum_{j=1}^{N_R} |\hat{m}_{i,j}|^2\right]^{1/2}, \text{ for } i \in \{1 \ldots N_T\}. \quad \text{Eq (23)}$$

It can be shown that the use of $\tilde{\Sigma}$ in the computation for $Q_P$ results in nearly un-measurable degradation in performance relative to the use of the exact singular values in $\Sigma$.

A matrix $C_M$ may then be defined as:

$$C_M = \tilde{\Sigma} \hat{M}. \quad \text{Eq (24)}$$

The singular value decomposition of the matrix $C_M$ is then given as:

$$C_M = U_M \Sigma_M V_M^H \text{ or } U_M^H C_M V_M = \Sigma_M. \quad \text{Eq (25)}$$

The unitary matrix $Q_M$ that solves the minimization problem shown in equation (18) is then given as:

$$Q_M = U_M V_M^H = \tilde{U}^H. \quad \text{Eq (26)}$$

An enhanced orthogonal matched filter $M_M$, which is the solution to the minimization problem in equation (18), may then be expressed as:

$$M_M = \tilde{\Sigma}^T \tilde{U}^H = \tilde{\Sigma}^T U_M V_M^H. \quad \text{Eq (27)}$$

Alternatively, the polar decomposition of $C_M$ may be performed as described above, which may be expressed as:

$$C_M = Z_M P_M. \quad \text{Eq (28)}$$

The unitary matrix $Q_M$ that solves the minimization problem shown in equation (18) may then be given as:

$$Q_M = Z_M = \tilde{U}^H. \quad (29)$$

The enhanced orthogonal matched filter $M_M$ may then be expressed as:

$$M_M = \tilde{\Sigma}^T Z_M. \quad \text{Eq (30)}$$

It can be shown that the matrix $Z_M$ from the polar decomposition is the optimal result for the matrix $Q_M$ for the minimum square error computation (i.e., $Q_M = Z_M$). Thus, the polar decomposition and minimum square error computation both yield the same orthogonal matched filter $M_M$.

FIG. 1 shows a flow diagram of an embodiment of a process 100 for deriving an orthogonal matched filter matrix M based on a steered reference. Initially, the receiver receives and processes the steered reference to obtain an estimate of $u_m \sigma_m$ for each of multiple eigenmodes of H (step 112). This processing may be performed as described above. An initial matched filter matrix $\hat{M}$ is then formed whose rows $\hat{m}_m$, for $m \in \{1 \ldots N_T\}$, are derived based on the estimates of $u_m \sigma_m$. The orthogonal matched filter matrix M may then be obtained from the initial matched filter matrix $\hat{M}$ using any one of the orthogonalization techniques described above.

For the QR factorization technique, the matrix $\hat{M}$ is factorized to obtain the matrices $Q_F$ and $R_F$ (step 122). The orthogonal matched filter matrix M is then obtained as shown in equation (17) (step 124) and the singular value estimates $\tilde{\Sigma}$ are obtained as the diagonal elements of $R_F$ (step 126).

For the minimum square error technique, estimates of the singular values, $\tilde{\Sigma}$, are obtained as the 2-norm of the columns of $\hat{M}^T$ (step 132). The matrix $C_M$ is then computed as shown in equation (24) (step 134). Singular value decomposition of $C_M$ is next computed as shown in equation (25) (step 136).

The orthogonal matched filter matrix $\tilde{M}$ is then obtained as shown in equation (27) (step 138).

For the polar decomposition technique, estimates of the singular values, $\Sigma$, are obtained as the 2-norm of the columns of $\hat{M}^T$ (step 142). The matrix $C_M$ is then computed as shown in equation (24) (step 144). Polar decomposition of $C_M$ is next computed as shown in equation (28) (step 146). The orthogonal matched filter matrix $\tilde{M}$ is then obtained as shown in equation (30) (step 148).

The orthogonal matched filter matrix $\tilde{M}$ may thereafter be used to perform matched filtering of a received data transmission (step 150).

The orthogonalization of the matched filter matrix provides several benefits. First, the use of an orthogonal matched filter matrix $\tilde{M}$ avoids cross-talk between the eigenmodes of H. The derivation of the initial matched filter matrix $\hat{M}$ piecemeal based on the steered reference does not guarantee that the eigenvectors of $\hat{M}^T$ are orthogonal. The lack of orthogonality results in performance degradation. The orthogonalization of the matched filter matrix avoids this performance degradation.

Second, QR factorization can improve the quality of the eigenvectors associated with smaller singular values. Without QR factorization, the quality of the estimates of the eigenvectors is not constant, and the estimates of the eigenvectors associated with smaller singular values are likely to be lower in quality. QR factorization can improve the quality of the eigenvectors associated with smaller singular values by rejecting certain noise components, as described above. Polar decomposition may have similar effect, but not in the direct way as QR factorization.

Third, orthogonalization may reduce the amount of resources needed to transmit the steered reference. If orthogonalization is not performed, then high quality estimates of $\Sigma$ and U would be needed to ensure low cross-talk among the eigenmodes. A longer transmission period would then be needed for the steered reference for the eigenvectors associated with smaller singular values to ensure that the desired quality is obtained. High quality estimates of $\Sigma$ and U would thus require a longer period of transmission for the steered reference (which would consume more valuable system resources) and a longer integration period for the steered reference at the receiver (which may result in longer delay for data transmission). Orthogonalization can provide the desired performance without the need for high quality estimates of $\Sigma$ and U.

MIMO-OFDM System

The techniques for deriving eigenvectors used for spatial processing are now described for an exemplary wideband MIMO communication system that employs orthogonal frequency division multiplexing (OFDM). OFDM effectively partitions the overall system bandwidth into a number of ($N_F$) orthogonal subbands, which are also referred to as tones, frequency bins, or frequency subchannels. With OFDM, each subband is associated with a respective subcarrier upon which data may be modulated. For a MIMO-OFDM system, each subband may be associated with multiple eigenmodes, and each eigenmode of each subband may be viewed as an independent transmission channel.

For OFDM, the data or pilot to be transmitted on each usable subband is first modulated (i.e., mapped to modulation symbols) using a particular modulation scheme. One modulation symbol may be transmitted on each usable subband in each symbol period. A signal value of zero may be sent for each unused subband. For each OFDM symbol period, the modulation symbols for the usable subbands and zero signal values for the unused subbands (i.e., the modulation symbols and zeros for all $N_F$ subbands) are transformed to the time domain using an inverse fast Fourier transform (IFFT) to obtain a transformed symbol that comprises $N_F$ time-domain samples. To combat inter-symbol interference (ISI) caused by frequency selective fading, a portion of each transformed symbol is often repeated (which is often referred to as adding a cyclic prefix) to form a corresponding OFDM symbol. The OFDM symbol is then processed and transmitted over the wireless channel. An OFDM symbol period, which is also referred to as a symbol period, corresponds to the duration of one OFDM symbol.

For this exemplary system, the downlink and uplink share a single frequency band using time-division duplex (TDD). For a TDD MIMO-OFDM system, the downlink and uplink channel responses may be assumed to be reciprocal of one another. That is, if H(k) represents a channel response matrix from antenna array A to antenna array B for subband k, then a reciprocal channel implies that the coupling from array B to array A is given by $H^T(k)$.

Figure 2:
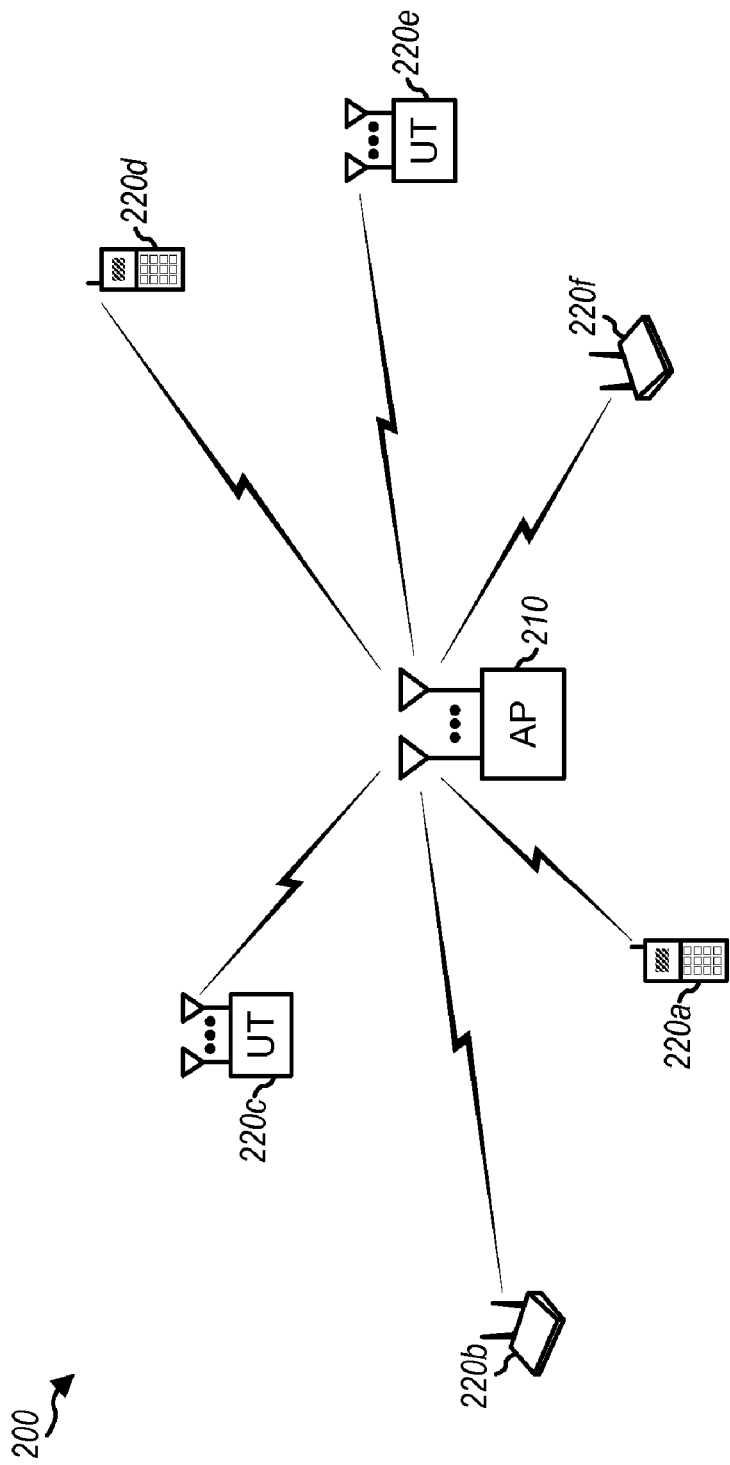
FIG. 2 shows a wireless communication system.

FIG. 2 shows a wireless communication system 200 that includes a number of access points (APs) 210 that communicate with a number of user terminals (UTs) 220. (For simplicity, only one access point is shown in FIG. 2.) An access point may also be referred to as a base station or some other terminology. Each user terminal may be a fixed or mobile terminal and may also be referred to as an access terminal, a mobile station, a remote station, a user equipment (UE), a wireless device, or some other terminology. Each user terminal may communicate with one or possibly multiple access points on the downlink and/or the uplink at any given moment. The downlink (i.e., forward link) refers to transmission from the access point to the user terminal, and the uplink (i.e., reverse link) refers to transmission from the user terminal to the access point. The channel response between each access point and each user terminal may be characterized by a set of channel response matrices H(k), for k∈K where K represents the set of all subbands of interest (e.g., the usable subbands).

In the following description for a pair of communicating access point and user terminal, it is assumed that calibration has been performed to account for differences between the transmit and receive chains of the access point and the user terminal. The results of the calibration are diagonal matrices $\hat{K}_{ap}(k)$ and $\hat{K}_{ut}(k)$, for k∈K, to be used at the access point and the user terminal, respectively, on the transmit path. A "calibrated" downlink channel response, $H_{cdn}(k)$, observed by the user terminal and a "calibrated" uplink channel response, $H_{cup}(k)$, observed by the access point may then be expressed as:

$$H_{cdn}(k)=H_{dn}(k)\hat{K}_{ap}(k), \text{ for } k \in K, \qquad \text{Eq (31a)}$$

$$H_{cup}(k)=H_{up}(k)\hat{K}_{ut}(k), \text{ for } k \in K, \text{ and} \qquad \text{Eq (31b)}$$

$$H_{cdn}(k) \approx H_{cup}^T(k), \text{ for } k \in K, \qquad \text{Eq (31c)}$$

where $H_{dn}(k)=R_{ut}(k)H(k)T_{ap}(k)$ is the "effective" downlink channel response, which includes the responses of the transmit chain $T_{ap}(k)$ at the access point and the receive chain $R_{ut}(k)$ at the user terminal;

$H_{up}(k)=R_{ap}(k)H^T(k)T_{ut}(k)$ is the "effective" uplink channel response, which includes the responses of the transmit chain $T_{ut}(k)$ at the user terminal and the receive chain $R_{ap}(k)$ at the access point; and H(k) is an ($N_{ut} \times N_{ap}$) channel response matrix between the $N_{ap}$ antennas at the access point and the $N_{ut}$ antennas at the user terminal.

If calibration is not performed, then the matrices $\hat{K}_{ap}(k)$ and $\hat{K}_{ut}(k)$, for $k \in K$, are each set to the identity matrix I.

Figure 3:
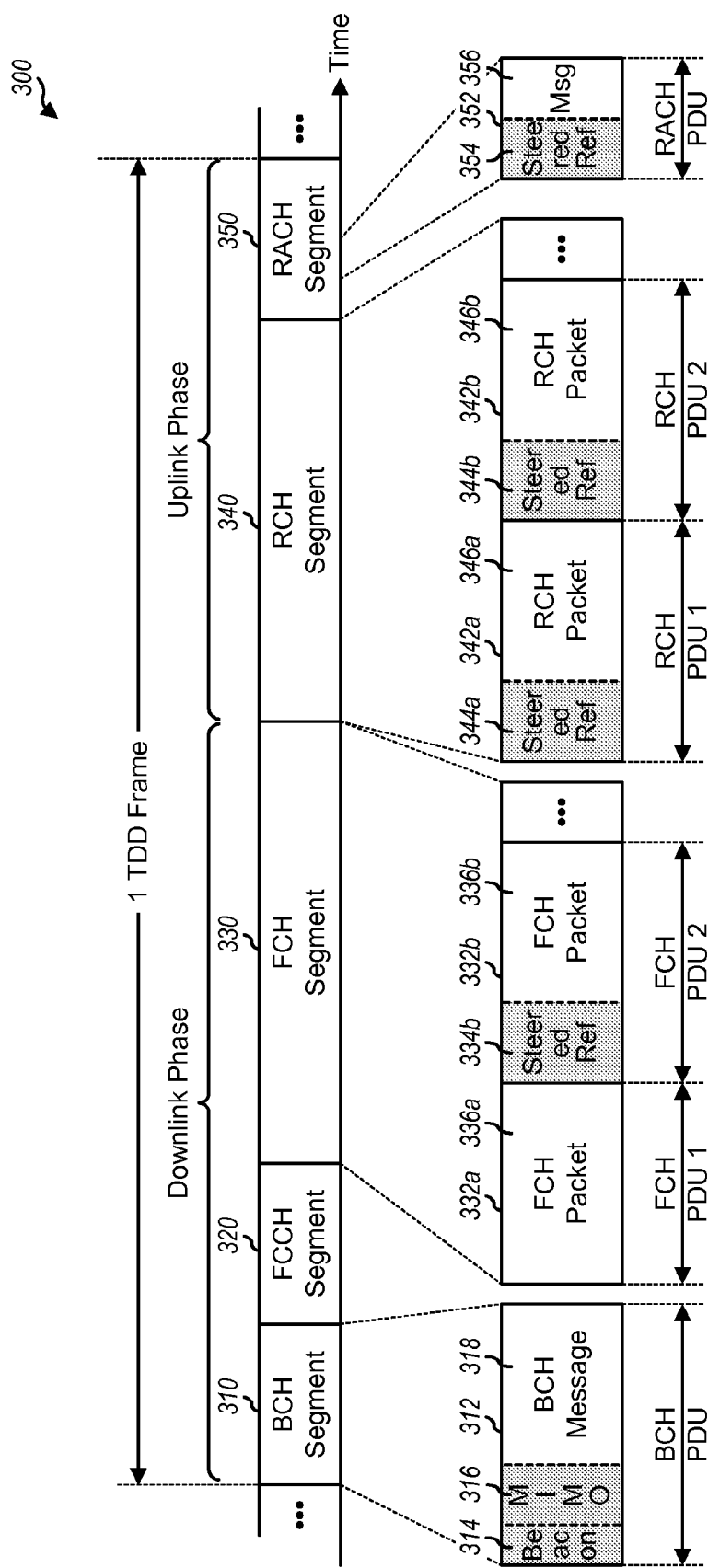
FIG. 3 shows a frame structure for a TDD MIMO-OFDM system.

FIG. 3 shows an embodiment of a frame structure 300 that may be used for a TDD MIMO-OFDM system. Data transmission occurs in units of TDD frames, with each TDD frame covering a particular time duration (e.g., 2 msec). Each TDD frame is partitioned into a downlink phase and an uplink phase. The downlink phase is further partitioned into multiple segments for multiple downlink transport channels. In the embodiment shown in FIG. 3, the downlink transport channels include a broadcast channel (BCH), a forward control channel (FCCH), and a forward channel (FCH). Similarly, the uplink phase is partitioned into multiple segments for multiple uplink transport channels. In the embodiment shown in FIG. 3, the uplink transport channels include a reverse channel (RCH) and a random access channel (RACH).

In the downlink phase, a BCH segment 310 is used to transmit one BCH protocol data unit (PDU) 312, which includes a beacon pilot 314, a MIMO pilot 316, and a BCH message 318. The beacon pilot is transmitted from all access point antennas and is used by the user terminals for timing and frequency acquisition. The MIMO pilot is transmitted from all access point antennas with different orthogonal codes and is used by the user terminals for channel estimation. The BCH message carries system parameters for the user terminals in the system. An FCCH segment 320 is used to transmit one FCCH PDU, which carries assignments for downlink and uplink resources and other signaling for the user terminals. An FCH segment 330 is used to transmit one or more FCH PDUs 332. Different types of FCH PDU may be defined. For example, an FCH PDU 332a includes only a data packet 336a, and an FCH PDU 332b includes a downlink steered reference 334b and a data packet 336b.

In the uplink phase, an RCH segment 340 is used to transmit one or more RCH PDUs 342 on the uplink. Different types of RCH PDU may also be defined. For example, an RCH PDU 342a includes an uplink steered reference 344a and a data packet 346a. An RACH segment 350 is used by the user terminals to gain access to the system and to send short messages on the uplink. An RACH PDU 352 may be sent within RACH segment 350 and includes an uplink steered reference 354 and a message 356.

For the embodiment shown in FIG. 3, the beacon and MIMO pilots are sent on the downlink in the BCH segment in each TDD frame. A steered reference may or may not be sent in any given FCH/RCH PDU. A steered reference may also be sent in an RACH PDU to allow the access point to estimate pertinent vectors during system access.

For simplicity, the following description is for a communication between one access point and one user terminal. The MIMO pilot is transmitted by the access point and used by the user terminal to obtain an estimate of the calibrated downlink channel response, $\hat{H}cdn(k)$, for $k \in K$. The calibrated uplink channel response may then be estimated as $\hat{H}_{cup}(k) = \hat{H}_{cdn}^T(k)$. Singular value decomposition may be performed to diagonalized the matrix $\hat{H}_{cup}(k)$ for each subband, which may be expressed as:

$$\hat{H}_{cup}(k) = \hat{U}_{ap}(k)\hat{\Sigma}(k)\hat{V}_{ut}^H(k), \text{ for } k \in K, \quad \text{Eq (32)}$$

where $\hat{U}_{ap}(k)$ is an $(N_{ap} \times N_{ap})$ unitary matrix of left eigenvectors of $\hat{H}_{cup}(k)$;

$\hat{\Sigma}(k)$ is an $(N_{ap} \times N_{ut})$ diagonal matrix of singular values of $\hat{H}_{cup}(k)$; and $\hat{V}_{ut}(k)$ is an $(N_{ut} \times N_{ut})$ unitary matrix of right eigenvectors of $\hat{H}_{cup}(k)$.

Similarly, the singular value decomposition of the estimated calibrated downlink channel response matrix, $\hat{H}_{cdn}(k)$, may be expressed as:

$$\hat{H}_{cdn}(k) = \hat{V}_{ut}^*(k)\hat{\Sigma}(k)\hat{U}_{ap}^T(k), \text{ for } k \in K, \quad \text{Eq (33)}$$

where the matrices $\hat{V}_{ut}^*(k)$ and $\hat{U}_{ap}^*(k)$ are unitary matrices of left and right eigenvectors, respectively, of $\hat{H}_{cdn}(k)$.

As shown in equations (32) and (33), the matrices of left and right eigenvectors for one link are the complex conjugate of the matrices of right and left eigenvectors, respectively, of the other link. For simplicity, reference to the matrices $\hat{U}_{ap}(k)$ and $\hat{V}_{ut}(k)$ in the following description may also refer to their various other forms (e.g., $\hat{V}_{ut}(k)$ may refer to $\hat{V}_{ut}(k)$, $\hat{V}_{ut}^*(k)$, $\hat{V}_{ut}^T(k)$, and $\hat{V}_{ut}^H(k)$). The matrices $\hat{U}_{ap}(k)$ and $\hat{V}_{ut}(k)$ may be used by the access point and user terminal, respectively, for spatial processing and are denoted as such by their subscripts. The matrix $\hat{\Sigma}(k)$ includes singular value estimates that represent the gains for the independent channels (or eigenmodes) of the channel response matrix H(k) for the k-th subband.

The singular value decomposition may be performed independently for the channel response matrix $\hat{H}_{cup}(k)$ for each of the usable subbands to determine the $N_S$ eigenmodes for the subband. The singular value estimates for each diagonal matrix $\hat{\Sigma}(k)$ may be ordered such that $\{\hat{\sigma}_1(k) \geq \hat{\sigma}_2(k) \geq \ldots \geq \hat{\sigma}_{N_S}(k)\}$, where $\hat{\sigma}_1(k)$ is the largest singular value estimate and $\hat{\sigma}_{N_S}(k)$ is the smallest singular value estimate for subband k. When the singular value estimates for each diagonal matrix $\hat{\Sigma}(k)$ are ordered, the eigenvectors (or columns) of the associated matrices $\hat{U}(k)$ and $\hat{V}(k)$ are also ordered correspondingly. After the ordering, $\hat{\sigma}_1(k)$ represents the singular value estimate for the best eigenmode for subband k, which is also often referred to as the "principal" eigenmode.

A "wideband" eigenmode may be defined as the set of same-order eigenmodes of all subbands after the ordering. Thus, the m-th wideband eigenmode includes the m-th eigenmodes of all subbands. Each wideband eigenmode is associated with a respective set of eigenvectors for all of the subbands. The "principal" wideband eigenmode is the one associated with the largest singular value estimate in the matrix $\hat{\Sigma}(k)$ for each of the subbands.

The user terminal can transmit a steered reference on the uplink. The uplink steered reference for the m-th wideband eigenmode may be expressed as:

$$x_{up,sr,m}(k) = \hat{K}_{ut}(k)\hat{v}_{ut,m}(k)p(k), \text{ for } k \in K, \quad \text{Eq (34)}$$

where $\hat{v}_{ut,m}(k)$ is the m-th column of the matrix $\hat{V}_{ut}(k)$ for the k-th subband, with $\hat{V}_{ut}(k) = [\hat{v}_{ut,1}(k) \, \hat{v}_{ut,2}(k) \ldots \hat{v}_{ut,N_{ut}}(k)]$; and p(k) is the pilot symbol for the k-th subband.

The received uplink steered reference at the access point may be expressed as:

$$r_{up,sr,m}(k) = H_{up}(k)x_{up,sr,m}(k) + n_{up}(k) \quad \text{Eq (35)}$$
$$= H_{up}(k)\hat{K}_{ut}(k)\hat{v}_{ut,m}(k)p(k) + n_{up}(k)$$
$$\approx \hat{u}_{ap,m}(k)\hat{\sigma}_m(k)p(k) + n_{up}(k), \text{ for } k \in K,$$

where $\hat{u}_{ap,m}(k)$ is the m-th column of the matrix $\hat{U}_{ap}(k)$ for the k-th subband, with $\hat{U}_{ap}(k) = [\hat{u}_{ap,1}(k) \, \hat{u}_{ap,2}(k) \ldots \hat{u}_{ap,N_{ap}}(k)]$; and $\hat{\sigma}_m(k)$ is the singular value estimate for the k-th subband of the m-th wideband eigenmode.

The access point can obtain an initial matched filter matrix $\hat{M}_{ap}(k)$, for $k \in K$, based on the uplink steered reference, as described above. The access point may thereafter obtain an enhanced orthogonal matched filter matrix $\tilde{M}_{ap}(k)$, for k∈K, based on $\hat{M}_{ap}(k)$ and using any one of the orthogonalization techniques described above.

Using QR factorization, the matrix $\tilde{M}_{ap}(k)$ may be obtained as:

$$\hat{M}_{ap}^T(k) = Q_{ap}(k)\tilde{R}_{ap}(k), \text{ or} \qquad \text{Eq (36a)}$$

$$\tilde{M}_{ap}(k) = \tilde{R}_{ap}^T(k)Q_{ap}^T(k) = \Sigma_{ap}^T(k)\tilde{U}_{ap}^H(k), \qquad \text{Eq (36b)}$$

where $Q_{ap}(k)$ is a unitary matrix that is the ortho-normal basis for $\tilde{M}_{ap}(k)$;

$\tilde{R}_{ap}(k)$ is a diagonal matrix derived based on $\hat{M}_{ap}(k)$; and $\Sigma_{ap}(k) = \tilde{R}_{ap}(k)$ and $\tilde{U}_{ap}^*(k) = Q_{ap}(k)$.

Using mean square error computation, the matrix $\tilde{M}_{ap}(k)$ may be obtained as:

$$\tilde{M}_{ap}(k) = \Sigma_{ap}^T(k)U_{Map}(k)V_{Map}^H(k) = \Sigma_{ap}^T(k)\tilde{U}_{ap}^H(k), \text{ for } k \in K, \qquad \text{Eq (37)}$$

where $$C_{ap}(k) = \Sigma_{ap}(k)\hat{M}_{ap}(k) = U_{Map}(k)\Sigma_{Map}(k)V_{Map}^H(k); \text{ for } k \in K, \qquad \text{Eq (38)}$$

$\Sigma_{ap}(k)$ is the diagonal matrix whose elements are the 2-norm of the columns of $\hat{M}_{ap}^T(k)$; and $\tilde{U}_{ap}^H(k) = U_{Map}(k)V_{Map}^H(k)$.

Using polar decomposition, the matrix $\tilde{M}_{ap}(k)$ may be obtained as:

$$\tilde{M}_{ap}(k) = \Sigma_{ap}^T(k)Z_{ap}(k) = \Sigma_{ap}^T(k)\tilde{U}_{ap}^H(k), \text{ for } k \in K. \qquad \text{Eq (39)}$$

where $$C_{ap}(k) = \Sigma_{ap}(k)\hat{M}_{ap}(k) = Z_{ap}(k)P_{ap}(k), \text{ for } k \in K; \text{ and} \qquad \text{Eq (40)}$$

$\tilde{U}_{ap}^H(k) = Z_{ap}(k)$.

The matrix $\tilde{M}_{ap}(k)$ may be used by the access point for matched filtering of uplink data transmission from the user terminal, as described below.

The spatial processing performed by the user terminal to transmit data on multiple eigenmodes on the uplink may be expressed as:

$$x_{up}(k) = \hat{K}_{ut}(k)\hat{V}_{ut}(k)s_{up}(k), \text{ for } k \in K, \qquad \text{Eq (41)}$$

where $s_{up}(k)$ is the data vector and $x_{up}(k)$ is the transmit vector for the k-th subband for the uplink. Uplink data transmission can occur on any number of wideband eigenmodes from 1 to $N_S$.

The received uplink data transmission at the access point may be expressed as:

$$r_{up}(k) = H_{up}(k)x_{up}(k) + n_{up}(k) \qquad \text{Eq (42)}$$
$$= H_{up}(k)\hat{K}_{ut}(k)\hat{V}_{ut}(k)s_{up}(k) + n_{up}(k)$$
$$= \hat{U}_{ap}(k)\hat{\Sigma}(k)s_{up}(k) + n_{up}(k), \text{ for } k \in K,$$

where $r_{up}(k)$ is the receive vector for the uplink data transmission for the k-th subband.

The matched filtering by the access point may be expressed as:

$$\hat{s}_{up}(k) = \underline{G}_{ap}(k)\tilde{M}_{ap}(k)r_{up}(k) \qquad \text{Eq (43)}$$
$$= \underline{G}_{ap}(k)\underline{\hat{\Sigma}}^T(k)\underline{\tilde{U}}_{ap}^H(k)(\hat{U}_{ap}(k)\hat{\Sigma}(k)s_{up}(k) + n_{up}(k))$$
$$\approx s_{up}(k) + \tilde{n}_{up}(k), \text{ for } k \in K,$$

where $\hat{\Sigma}(k) = \text{diag}(\hat{\sigma}_{1,1}(k) \ \hat{\sigma}_{2,2}(k) \ \ldots \ \hat{\sigma}_{N_T,N_T}(k))$;

and $$\underline{G}_{ap}(k) = \text{diag}(1/\hat{\sigma}_{1,1}^2(k) \ 1/\hat{\sigma}_{2,2}^2(k) \ \ldots \ 1/\hat{\sigma}_{N_T,N_T}^2(k)).$$

For the TDD MIMO system, the access point may also use the matrices $\tilde{U}_{ap}(k)$, for k∈K, for spatial processing for data transmission on the downlink to the user terminal. The spatial processing performed by the access point to transmit data on multiple eigenmodes on the downlink may be expressed as:

$$x_{dn}(k) = \hat{K}_{ap}(k)\tilde{U}_{ap}^*(k)s_{dn}(k), \text{ for } k \in K, \qquad \text{Eq (44)}$$

where $s_{dn}(k)$ is the data vector and $x_{dn}(k)$ is the transmit vector for the k-th subband for the downlink. Downlink data transmission can similarly occur on any number of wideband eigenmodes from 1 to $N_S$.

The received downlink data transmission at the user terminal may be expressed as:

$$r_{dn}(k) = H_{dn}(k)x_{dn}(k) + n_{dn}(k) \qquad \text{Eq (45)}$$
$$= H_{dn}(k)\hat{K}_{ap}(k)\underline{\tilde{U}}_{ap}^*(k)s_{dn}(k) + n_{dn}(k)$$
$$\approx \hat{V}_{ut}^*(k)\hat{\Sigma}(k)s_{dn}(k) + n_{dn}(k), \text{ for } k \in K,$$

where $r_{dn}(k)$ is the receive vector for the downlink data transmission for the k-th subband.

The matched filtering by the user terminal may be expressed as:

$$\hat{s}_{dn}(k) = \underline{G}_{ut}(k)\hat{M}_{ut}(k)r_{dn}(k) \qquad \text{Eq (46)}$$
$$= \underline{G}_{ut}(k)\hat{\Sigma}^T(k)\hat{V}_{ut}^T(k)(\hat{V}_{ut}^*(k)\hat{\Sigma}(k)s_{dn}(k) + n_{dn}(k))$$
$$= s_{dn}(k) + \tilde{n}_{dn}(k), \text{ for } k \in K,$$

where $\hat{M}_{ut}(k) = \hat{\Sigma}^T(k)\hat{V}_{ut}^T(k)$ is the matched filter for the user terminal;

$\hat{\Sigma}(k) = \text{diag}(\hat{\sigma}_{1,1}(k) \ \hat{\sigma}_{2,2}(k) \ \ldots \ \hat{\sigma}_{N_S,N_S}(k))$; and $G_{ut}(k) = \text{diag}(1/\hat{\sigma}_{1,1}^2(k) \ 1/\hat{\sigma}_{2,2}^2(k) \ \ldots \ 1/\hat{\sigma}_{N_S,N_S}^2(k))$.

The diagonal matrix $\hat{\Sigma}(k)$ is derived from the singular value decomposition shown in equation (32).

Table 1 summarizes the spatial processing at the access point and user terminal for both data transmission and reception on multiple wideband eigenmodes.

TABLE 1

| | Downlink | Uplink |
|---|---|---|
| Access Point | Transmit: $x_{dn}(k) = \hat{K}_{ap}(k)\tilde{U}_{ap}^*(k)s_{dn}(k)$ | Receive: $\hat{s}_{up}(k) = \underline{G}_{ap}(k)\hat{\Sigma}^T(k)\tilde{U}_{ap}^H(k)r_{up}(k)$ |

TABLE 1-continued

| | Downlink | Uplink |
|---|---|---|
| User Terminal | Receive: $\hat{s}_{dn}(k) = \underline{G}_{ut}(k)\hat{\underline{\Sigma}}^T(k)\hat{\underline{V}}_{ut}^T(k)\underline{r}_{dn}(k)$ | Transmit: $\underline{x}_{up}(k) = \hat{\underline{K}}_{ut}(k)\hat{\underline{V}}_{ut}(k)\underline{s}_{up}(k)$ |

In Table 1, s(k) is the data vector, x(k) is the transmit vector, r(k) is the receive vector, and ŝ(k) is an estimate of the data vector s(k), where all vectors are for subband k. The subscripts "dn" and "up" for these vectors denote downlink and uplink transmissions, respectively.

It can be shown that the use of the matrices $\tilde{U}_{ap}(k)$, for k∈K, (with orthogonalized columns) for spatial processing for downlink data transmission can provide substantial improvement over the use of matrices $\hat{U}_{ap}(k)$, for k∈K, (with unorthogonalized columns) obtained from the initial matched filter matrices $\hat{M}_{ap}(k)$, for k∈K.

Figure 4:
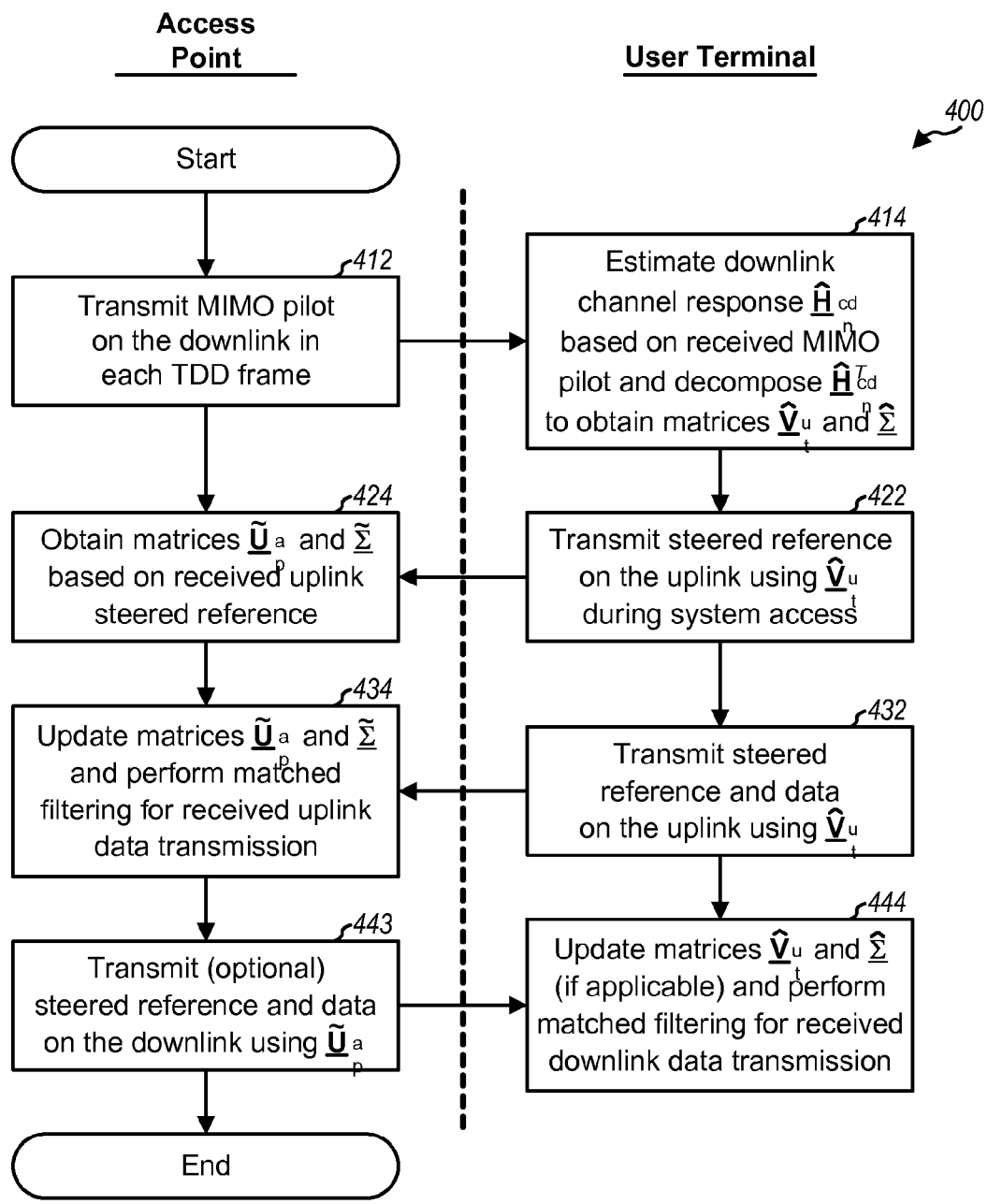
FIG. 4 shows transmission of steered reference and data on the downlink and uplink for an exemplary transmission scheme.

FIG. 4 shows transmission of steered reference and data on the downlink and uplink for an exemplary transmission scheme. The MIMO pilot is transmitted on the downlink by the access point in each TDD frame (block 412). The user terminal receives and processes the downlink MIMO pilot to obtain an estimate the downlink channel response $\hat{H}_{cdn}(k)$, for k∈K. The user terminal then estimates the uplink channel response as $\hat{H}_{cup}(k)=\hat{H}_{cdn}^T(k)$ and performs singular value decomposition of $\hat{H}_{cup}(k)$ to obtain the matrices $\hat{\Sigma}(k)$ and $\hat{V}_{ut}(k)$, for k∈K, as shown in equation (32) (block 414).

The user terminal then transmits the uplink steered reference on the RACH or the RCH using the matrices $\hat{V}_{ut}(k)$, for k∈K, as shown in equation (34) and FIG. 3, during system access (step 422). The columns of $\hat{V}_{ut}(k)$ are also referred to as steering vectors when used for data transmission. The access point receives and processes the uplink steered reference on the RACH or the RCH to obtain the matrices $\hat{\Sigma}(k)$ and $\tilde{U}_{ap}(k)$, for k∈K, as described above (step 424). The columns of $\tilde{U}_{ap}(k)$ are eigenvectors that may be used for both data reception as well as data transmission. The user terminal may thereafter transmit the uplink steered reference and data on the RCH using the matrices $\hat{V}_{ut}(k)$, for k∈K, as shown in equation (41) and FIG. 3 (step 432). The access point receives and processes the uplink steered reference on the RCH to update the matrices $\hat{\Sigma}(k)$ and $\tilde{U}_{ap}(k)$, for k∈K (step 434). The access point also performs matched filtering for the received uplink data transmission using the matrices $\hat{\Sigma}(k)$ and $\tilde{U}_{ap}(k)$ (also step 434).

The access point may thereafter transmit an optional downlink steered reference and data on the FCH using the matrices $\tilde{U}_{ap}(k)$, for k∈K, as shown in equation (44) and FIG. 3 (step 442). If a downlink steered reference is transmitted, then the user terminal can process the downlink steered reference to update the matrices $\hat{\Sigma}(k)$ and $\hat{V}_{ut}(k)$, for k∈K (step 444) and may also perform orthogonalization to ensure that the columns of $\hat{V}_{ut}(k)$ are orthogonal. The user terminal also performs matched filtering for the received downlink data transmission using the matrices $\hat{\Sigma}(k)$ and $\hat{V}_{ut}(k)$ (also step 444).

The pilot and data transmission scheme shown in FIG. 4 provides several advantages. First, the MIMO pilot transmitted by the access point may be used by multiple user terminals in the system to estimate the response of their respective MIMO channels. Second, the computation for the singular value decomposition of $\hat{H}_{cup}(k)$, for k∈K, is distributed among the user terminals (i.e., each user terminal performs singular value decomposition of its own set of estimated channel response matrices for the usable subbands). Third, the access point can obtain the matrices $\hat{\Sigma}(k)$ and $\tilde{U}_{ap}(k)$, for k∈K, which are used for uplink and downlink spatial processing, based on the steered reference without having to estimate the MIMO channel response.

Various other transmission schemes may also be implemented for MIMO and MIMO-OFDM systems, and this is within the scope of the invention. For example, the MIMO pilot may be transmitted by the user terminal and the steered reference may be transmitted by the access point.

Figure 5:
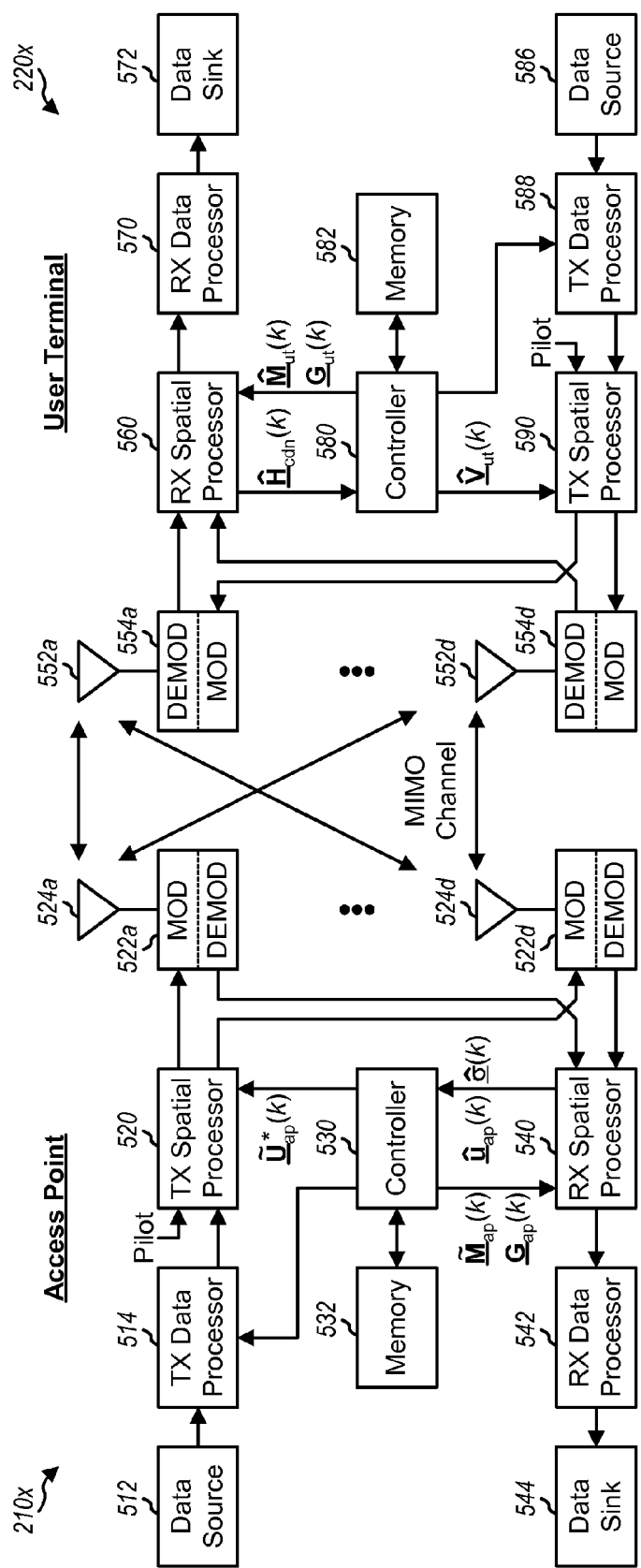
FIG. 5 shows a block diagram of an access point and a user terminal.

FIG. 5 shows a block diagram of an embodiment of an access point 210x and a user terminal 220x in MIMO-OFDM system 200. For clarity, in this embodiment, access point 210x is equipped with four antennas that can be used for data transmission and reception, and user terminal 220x is also equipped with four antennas for data transmission/reception. In general, the access point and user terminal may each be equipped with any number of transmit antennas and any number of receive antennas.

On the downlink, at access point 210x, a transmit (TX) data processor 514 receives traffic data from a data source 512 and signaling and other data from a controller 530. TX data processor 514 formats, codes, interleaves, and modulates the data to provide modulation symbols, which are also referred to as data symbols. A TX spatial processor 520 then receives and multiplexes the data symbols with pilot symbols, performs the required spatial processing with the matrices $\tilde{U}_{ap}^*(k)$, for k∈K, and provides four streams of transmit symbols for the four transmit antennas. Each modulator (MOD) 522 receives and processes a respective transmit symbol stream to provide a corresponding downlink modulated signal. The four downlink modulated signals from modulators 522a through 522d are then transmitted from antennas 524a through 524d, respectively.

At user terminal 220x, four antennas 552a through 552d receive the transmitted downlink modulated signals, and each antenna provides a received signal to a respective demodulator (DEMOD) 554. Each demodulator 554 performs processing complementary to that performed by modulator 522 and provides received symbols. A receive (RX) spatial processor 560 then performs matched filtering on the received symbols from all demodulators 554a through 554d to provide recovered data symbols, which are estimates of the data symbols transmitted by the access point. An RX data processor 570 further processes (e.g., symbol demaps, deinterleaves, and decodes) the recovered data symbols to provide decoded data, which may be provided to a data sink 572 for storage and/or a controller 580 for further processing.

RX spatial processor 560 also processes the received pilot symbols to obtain an estimate of the downlink channel response, $\hat{H}_{cdn}(k)$, for k∈K. Controller 580 may then decompose each matrix $\hat{H}_{cdn}(k)$ to obtain $\hat{\Sigma}(k)$ and $\hat{V}_{ut}(k)$. Controller 580 may further derive (1) the downlink matched filter matrices $\hat{M}_{ut}(k)$ for k∈K based on $\hat{\Sigma}(k)$ and $\hat{V}_{ut}(k)$, and (2) the scaling matrices $G_{ut}(k)$, for k∈K, based on $\hat{\Sigma}(k)$. Controller 580 may then provide $\hat{M}_{ut}(k)$ to RX data processor 560 for downlink matched filtering and $\hat{V}_{ut}(k)$ to a TX spatial processor 590.

The processing for the uplink may be the same or different from the processing for the downlink. Data and signaling are processed (e.g., coded, interleaved, and modulated) by a TX data processor 588, multiplexed with pilot symbols, and further spatially processed by TX spatial processor 590 with the matrices $\hat{V}_{ut}(k)$, for k∈K. The transmit symbols from TX spatial processor 590 are further processed by modulators 554a through 554d to generate four uplink modulated signals, which are then transmitted via antennas 552a through 552d.

At access point 510, the uplink modulated signals are received by antennas 524a through 524d and demodulated by demodulators 522a through 522d to provide received symbols for the uplink steered reference and data transmission. An RX spatial processor 540 then processes the received uplink steered reference to obtain estimates of $u_m \sigma_m$, for k∈K and m∈{1 ... $N_S$}, which are provided to controller 530. Controller then obtains $\hat{M}_{ap}(k)$ and $\Sigma(k)$ based on the estimates of $u_m \sigma_m$, performs orthogonalization of $\hat{M}_{ap}(k)$ to obtain $M_{ap}(k)$ and $\tilde{U}_{ap}(k)$, and derives $G_{ap}(k)$ based on $\Sigma(k)$. Controller 580 then provides $M_{ap}(k)$ and $G_{ap}(k)$ to RX spatial processor 540 for uplink matched filtering and $\tilde{U}_{ap}*(k)$ to TX spatial processor 520 for downlink spatial processing.

RX spatial processor 540 performs matched filtering of the received uplink data transmission with $M_{ap}(k)$ and $G_{ap}(k)$ to provide recovered data symbols, which are further processed by an RX data processor 542 to provide decoded data. The decoded data may be provided to a data sink 544 for storage and/or controller 530 for further processing.

Controller 530 performs the processing to obtain the matched filter matrices $M_{ap}(k)$ and the scaling matrices $G_{ap}(k)$, for k∈K, for uplink data transmission and the matrices $\tilde{U}_{ap}*(k)$, for k∈K, for downlink data transmission. Controller 580 performs the processing to obtain the matched filter matrices $\hat{M}_{ut}(k)$ and the scaling matrices $G_{ut}(k)$, for k∈K, for downlink data transmission and the matrices $\hat{V}_{ut}(k)$, for k∈K, for uplink data transmission. Controllers 530 and 580 further control the operation of various processing units at the access point and user terminal, respectively. Memory units 532 and 582 store data and program codes used by controllers 530 and 580, respectively.

Figure 6:
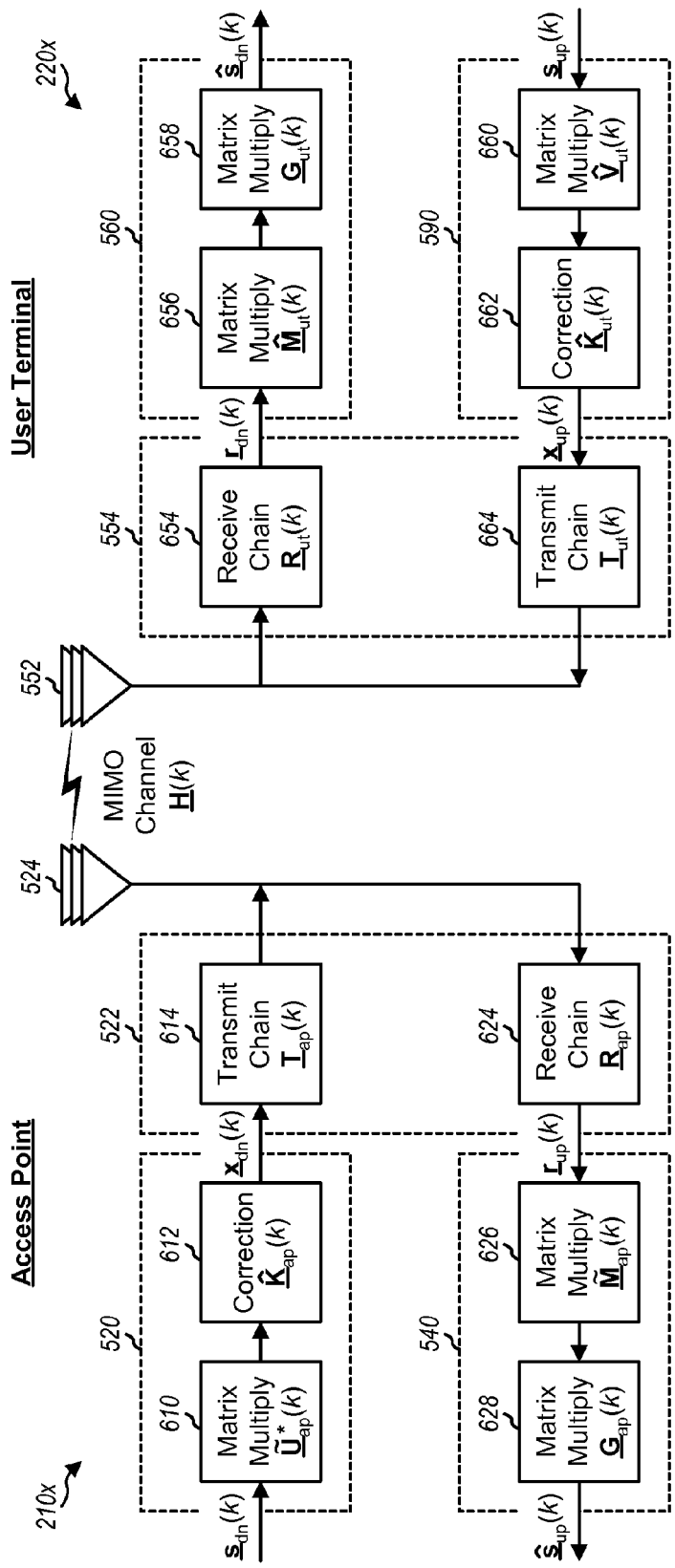
FIG. 6 shows a block diagram of the spatial processing performed by the access point and user terminal for data transmission on the downlink and uplink.

FIG. 6 shows a block diagram of the spatial processing performed by access point 210x and user terminal 220x to transmit data on multiple eigenmodes on the downlink and uplink.

On the downlink, within TX spatial processor 520 at access point 210x, the data vector $s_{dn}(k)$ for each subband k is first multiplied with the matrix $\tilde{U}_{ap}*(k)$ by a unit 610 and further multiplied with the correction matrix $\hat{K}_{ap}(k)$ by a unit 612 to obtain the transmit vector $x_{dn}(k)$ for subband k. The columns of the matrix $\tilde{U}_{ap}*(k)$ are orthogonalized as described above. The transmit vectors $x_{dn}(k)$, for k∈K, are then processed by a transmit chain 614 within modulator 522 and transmitted over the MIMO channel to user terminal 220x. Unit 610 performs the spatial processing for downlink data transmission.

At user terminal 220x, the downlink modulated signals are processed by a receive chain 654 within demodulator 554 to obtain the receive vectors $r_{dn}(k)$, for k∈K. Within RX spatial processor 560, the receive vector $r_{dn}(k)$ for each subband k is first multiplied with the matched filter matrix $\hat{M}_{ut}(k)$ by a unit 656 and further multiplied with the scaling matrix $G_{ut}(k)$ by a unit 658 to obtain the vector $\hat{s}_{dn}(k)$, which is an estimate of the data vector $s_{dn}(k)$ transmitted for subband k. Units 656 and 658 perform the downlink matched filtering.

On the uplink, within TX spatial processor 590 at user terminal 220x, the data vector $s_{up}(k)$ for each subband k is first multiplied with the matrix $\hat{V}_{ut}(k)$ by a unit 660 and then further multiplied with the correction matrix $\hat{K}_{ut}(k)$ by a unit 662 to obtain the transmit vector $x_{up}(k)$ for subband k. The transmit vectors $x_{up}(k)$, for k∈K, are then processed by a transmit chain 664 within modulator 554 and transmitted over the MIMO channel to access point 210x. Unit 660 performs the spatial processing for uplink data transmission.

At access point 210x, the uplink modulated signals are processed by a receive chain 624 within demodulator 522 to obtain the receive vectors $r_{up}(k)$, for k∈K. Within RX spatial processor 540, the receive vector $r_{up}(k)$ for each subband k is first multiplied with the matched filter matrix $M_{ap}(k)$ by a unit 626 and further multiplied by the scaling matrix $G_{ap}(k)$ by a unit 628 to obtain the vector $\hat{s}_{up}(k)$, which is an estimate of the data vector $s_{up}(k)$ transmitted for subband k. Units 626 and 628 perform the uplink matched filtering.

The techniques described herein to derive eigenvectors for spatial processing may be implemented by various means. For example, these techniques may be implemented in hardware, software, or a combination thereof. For a hardware implementation, the elements used for these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques may be implemented with modules (e.g., procedures, functions, and so on) that perform the functions described herein. The software codes may be stored in a memory unit (e.g., memory units 532 and 582 in FIG. 5) and executed by a processor (e.g., controllers 530 and 580). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. An apparatus in a wireless multiple-input multiple-output (MIMO) communication system for deriving a matched filter based on a steered reference, comprising:

means for obtaining a plurality of sets of received symbols for the steered reference received via a first link and generated based on a plurality of steering vectors; and means for deriving the matched filter based on the plurality of sets of received symbols, wherein the matched filter includes a plurality of eigenvectors corresponding to the plurality of steering vectors.

2. The apparatus of claim 1, wherein each of the plurality of sets of received symbols is for a steered reference symbol generated based on one of the plurality of steering vectors.

3. The apparatus of claim 1, wherein the plurality of eigenvectors of the matched filter are orthogonal to one another.

4. The apparatus of claim 3, wherein the plurality of eigenvectors of the matched filter are orthogonalized using QR factorization.

5. The apparatus of claim 4, further comprising:
means for estimating gains associated with the plurality of steering vectors based on the plurality of sets of received symbols; and
means for ordering the plurality of eigenvectors based on the estimated gains.

6. The apparatus of claim 3, wherein the plurality of eigenvectors of the matched filter are orthogonalized using minimum square error computation.

7. The apparatus of claim 3, wherein the plurality of eigenvectors of the matched filter are orthogonalized using polar decomposition.

8. The apparatus of claim 1, wherein the steered reference is received over multiple frames.

9. The apparatus of claim 1, further comprising:
means for performing matched filtering of a data transmission received via the first link using the matched filter.

10. An apparatus for deriving a matched filter based on a steered reference in a wireless multiple-input multiple-output (MIMO) communication system comprising a memory unit having instructions using one or more processors thereon, the instructions comprising:
code for obtaining a plurality of sets of received symbols for the steered reference received via a first link and generated based on a plurality of steering vectors; and
code for deriving the matched filter based on the plurality of sets of received symbols, wherein the matched filter includes a plurality of eigenvectors corresponding to the plurality of steering vectors.

11. The apparatus of claim 10, wherein each of the plurality of sets of received symbols is for a steered reference symbol generated based on one of the plurality of steering vectors.

12. The apparatus of claim 10, wherein the plurality of eigenvectors of the matched filter are orthogonal to one another.

13. The apparatus of claim 12, wherein the plurality of eigenvectors of the matched filter are orthogonalized using QR factorization.

14. The apparatus of claim 13, the instructions further comprising:
code for estimating gains associated with the plurality of steering vectors based on the plurality of sets of received symbols; and
code for ordering the plurality of eigenvectors based on the estimated gains.

15. The apparatus of claim 12, wherein the plurality of eigenvectors of the matched filter are orthogonalized using minimum square error computation.

16. The apparatus of claim 12, wherein the plurality of eigenvectors of the matched filter are orthogonalized using polar decomposition.

17. The apparatus of claim 10, wherein the steered reference is received over multiple frames.

18. The apparatus of claim 10, the instructions further comprising:
code for performing matched filtering of a data transmission received via the first link using the matched filter.

19. An apparatus in a wireless multiple-input multiple-output (MIMO) communication system for deriving eigenvectors used for spatial processing, comprising:
means for obtaining a plurality of sets of received symbols for a steered reference received via a first link and generated based on a plurality of steering vectors, wherein each of the plurality of sets of received symbols is for a steered reference symbol generated based on one of the plurality of steering vectors;

means for determining a plurality of scaled vectors based on the plurality of sets of received symbols, wherein each of the plurality of scaled vectors corresponds to a respective one of the plurality of steering vectors; and
means for deriving a plurality of eigenvectors based on the plurality of scaled vectors, wherein the plurality of eigenvectors are used for matched filtering of data transmission received via the first link.

20. The apparatus of claim 19, wherein each of the plurality of scaled vectors is determined based on at least one set of received symbols for at least one steered reference symbol generated based on the corresponding steering vector.

21. The apparatus of claim 19, wherein the plurality of eigenvectors are orthogonal to one another.

22. The apparatus of claim 21, wherein the means for deriving includes
means for performing QR factorization on the plurality of scaled vectors to obtain the plurality of eigenvectors.

23. The apparatus of claim 21, wherein the means for deriving includes
means for performing polar decomposition on the plurality of scaled vectors to obtain the plurality of eigenvectors.

24. The apparatus of claim 21, wherein the means for deriving includes
means for performing minimum square error computation on the plurality of scaled vectors to obtain the plurality of eigenvectors.

25. The apparatus of claim 21, further comprising:
means for estimating singular values based on the plurality of scaled vectors; and
means for deriving a matched filter for the first link based on the plurality of eigenvectors and the estimated singular values.

26. The apparatus of claim 21, wherein the plurality of eigenvectors are used for spatial processing for data transmission on a second link.

27. The apparatus of claim 26, wherein the first link is an uplink and the second link is a downlink in the MIMO communication system.

28. The apparatus of claim 21, wherein the MIMO communication system utilizes orthogonal frequency division multiplexing (OFDM), and wherein the plurality of eigenvectors are derived for each of a plurality of subbands.

29. An apparatus product in a wireless multiple-input multiple-output (MIMO) communication system for deriving eigenvectors used for spatial processing comprising a memory unit executable using one or more processors having instructions thereon, the instructions comprising:
code for obtaining a plurality of sets of received symbols for a steered reference received via a first link and generated based on a plurality of steering vectors, wherein each of the plurality of sets of received symbols is for a steered reference symbol generated based on one of the plurality of steering vectors;
code for determining a plurality of scaled vectors based on the plurality of sets of received symbols, wherein each of the plurality of scaled vectors corresponds to a respective one of the plurality of steering vectors; and
code for deriving a plurality of eigenvectors based on the plurality of scaled vectors, wherein the plurality of eigenvectors are used for matched filtering of data transmission received via the first link.

30. The apparatus of claim 29, wherein each of the plurality of scaled vectors is determined based on at least one set of received symbols for at least one steered reference symbol generated based on the corresponding steering vector.

31. The apparatus of claim 29, wherein the plurality of eigenvectors are orthogonal to one another.

32. The apparatus of claim 31, wherein the code for deriving includes
   code for performing QR factorization on the plurality of scaled vectors to obtain the plurality of eigenvectors.

33. The apparatus of claim 31, wherein the code for deriving includes
   code for performing polar decomposition on the plurality of scaled vectors to obtain the plurality of eigenvectors.

34. The apparatus of claim 31, wherein the code for deriving includes
   code for performing minimum square error computation on the plurality of scaled vectors to obtain the plurality of eigenvectors.

35. The apparatus of claim 31, further comprising:
   code for estimating singular values based on the plurality of scaled vectors; and
   code for deriving a matched filter for the first link based on the plurality of eigenvectors and the estimated singular values.

36. The apparatus of claim 31, wherein the plurality of eigenvectors are used for spatial processing for data transmission on a second link.

37. The apparatus of claim 36, wherein the first link is an uplink and the second link is a downlink in the MIMO communication system.

38. The apparatus of claim 31, wherein the MIMO communication system utilizes orthogonal frequency division multiplexing (OFDM), and wherein the plurality of eigenvectors are derived for each of a plurality of subbands.

* * * * *